(12) United States Patent
Hasenbusch

(10) Patent No.: US 8,651,167 B1
(45) Date of Patent: Feb. 18, 2014

(54) SAND PRINTED MOLD PACKAGE FOR CASTING A WHEEL ASSEMBLY HAVING DIRECTIONAL SOLIDIFICATION FEATURES

(75) Inventor: Ronald H. Hasenbusch, Grosse Pointe Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/605,048

(22) Filed: Sep. 6, 2012

(51) Int. Cl.
- B22C 9/00 (2006.01)
- B22D 27/00 (2006.01)
- B22D 15/00 (2006.01)

(52) U.S. Cl.
USPC .......................... 164/29; 164/122.1; 164/352

(58) Field of Classification Search
USPC .......................... 164/122, 122.1, 28, 29, 352
See application file for complete search history.

(56) References Cited

U.S. PATENT DOCUMENTS

| 4,609,029 | A | | 9/1986 | Vishnevsky et al. |
| 5,309,976 | A | | 5/1994 | Prichard et al. |
| 5,381,852 | A | * | 1/1995 | Schilling ........................ 164/137 |
| 5,680,895 | A | | 10/1997 | Frasier |
| 6,401,797 | B1 | | 6/2002 | Nitz et al. |
| 7,797,832 | B2 | | 9/2010 | Kamiya |
| 2008/0105996 | A1 | * | 5/2008 | Kloeb et al. ................... 264/219 |
| 2011/0062770 | A1 | | 3/2011 | Krajewski et al. |

FOREIGN PATENT DOCUMENTS

CN 201102061 8/2008

OTHER PUBLICATIONS

D. Apelian, Worldwide Report Aluminum Cast Alloys: Enabling Tools for Improved Performance, NADCA (Northern American Die Casting Association) 2009, 60 pgs, Wheeling, IL.
Mert Cetinel, Investigation and Development of the Quality Control of Al-Wheel Rim Production Process, 85 pgs, Izmir Institue of Technology, Izmir, Turkey, Oct. 2001.

* cited by examiner

*Primary Examiner* — Kevin P Kerns
*Assistant Examiner* — Steven Ha
(74) *Attorney, Agent, or Firm* — Damian Porcari; Price Heneveld LLP

(57) ABSTRACT

A mold package for casting a wheel assembly includes a sand printed drag mold having a cavity with a chill support chamber and a metal chill received in the support chamber. The mold package further includes at least one sand printed mold insert received in the cavity of the sand printed drag mold and a sand printed cope mold coupled to the sand printed drag mold such that a casting cavity for the wheel assembly is created by the exterior inner surfaces of the cope mold, the drag mold and the at least one insert.

10 Claims, 17 Drawing Sheets

SAND PRINTED MOLD PACKAGE FOR CASTING A WHEEL ASSEMBLY HAVING DIRECTIONAL SOLIDIFICATION FEATURES

FIELD OF THE INVENTION

The present invention generally relates to the use of additive manufacturing techniques for creating mold components or sand mold packages for use in casting prototype wheel assemblies for vehicle testing.

BACKGROUND OF THE INVENTION

Mold packages are often fabricated to cast molded parts and these mold packages will generally vary depending on the application and cast product requirements.

In developing prototype wheel assemblies, a mold package must be created to cast the wheel wherein a molten metal material will be poured into the mold package to form cast wheels. Such mold packages have generally been produced using subtractive manufacturing techniques such as using a CNC machine to carve molds from metal billets to form cope and drag mold packages having a mold cavity representing the shape of a wheel. Inherent with subtractive manufacturing techniques, the mold designer is limited as subtractive manufacturing techniques cannot produce all the specific geometrical configurations that may be incorporated in a wheel design such as undercuts and expanding cavities. Further, given the nature of a prototype wheel being used as a prototype for vehicle testing, it is not necessary to create a mold package that has the tolerances or cycle life of a mold package which would be used for a wheel that is in regular production. Thus, there is a desire to create mold packages that can incorporate intricate design features of various types of prototype wheels, wherein the mold package is able to be produced relatively quickly so that the prototype wheel can be cast and tested. Further, it is desirable to have a mold package that can be used for the prototype wheel assembly, but that does not have the manufacturing and design lead time of a standard production mold core package. Further, it is desirable to have a method which includes a mold forming technique that is capable of precisely creating the mold core package such that the resulting cast past is a near net shape of the wheel.

SUMMARY OF THE INVENTION

According to one aspect of the present invention, a mold package for casting a wheel includes a sand printed drag mold having a cavity with a chill support chamber and a metal chill received in the support chamber. The mold package further includes at least one sand printed mold insert received in the cavity of the sand printed drag mold and a sand printed cope mold coupled to the sand printed drag mold such that a casting cavity for the wheel assembly is created by the exterior inner surfaces of the cope mold, the drag mold and the at least one insert.

Another aspect of the present invention includes, a method of casting a wheel assembly including sand printing a drag mold, a cope mold and at least one mold insert, wherein the drag mold includes a cavity and a chill support chamber, and further wherein and the cope mold includes a frustum projection having a lower surface defining a wheel disk pattern. The method further includes positioning a metal chill in the chill support chamber of the drag mold and inserting the mold insert into the cavity of the drag mold. A casting cavity is formed or defined by closing the cope mold on the drag mold such that the frustum projection of the cope mold is generally disposed within the cavity of the drag mold. The casting cavity is the near net shape of the desired casting. A sprue or channel is incorporated into the cope mold such that the sprue is in fluid communication with the casting cavity. The method further includes casting a molten alloy into the casting cavity, such that a least a portion of the molten alloy is disposed adjacent to the chill. The molten alloy is then allowed to directionally solidify in the casting cavity to form a wheel, wherein the molten alloy solidifies beginning with molten alloy disposed adjacent to the chill.

Yet another aspect of the present invention includes, a method of casting a prototype wheel assembly wherein the method includes sand printing a sacrificial cope mold portion and a sacrificial drag mold portion of a mold package. The cope and drag mold portions have walls defining at least in part a mold cavity for a prototype wheel. A chill is positioned in the drag mold and at least one internal core is positioned within either the cope mold portion or the drag mold portion. The at least one internal core is configured to define at least in part a hub cavity, a disk cavity and a rim cavity for the cast prototype wheel assembly within the mold cavity. The method further includes closing the cope and drag mold portions around the at least one internal core to form a mold package and casting a molten material into the mold cavity, such that a least a portion of the molten material contacts the chill. The molten alloy is then allowed to directionally solidify in the casting cavity to form a wheel assembly, wherein the molten alloy solidifies beginning with molten alloy in contact with the chill. The method finally includes breaking away the sacrificial cope mold portion and the sacrificial drag mold portion to form a wheel assembly having a hub section, a disk section and a rim section.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
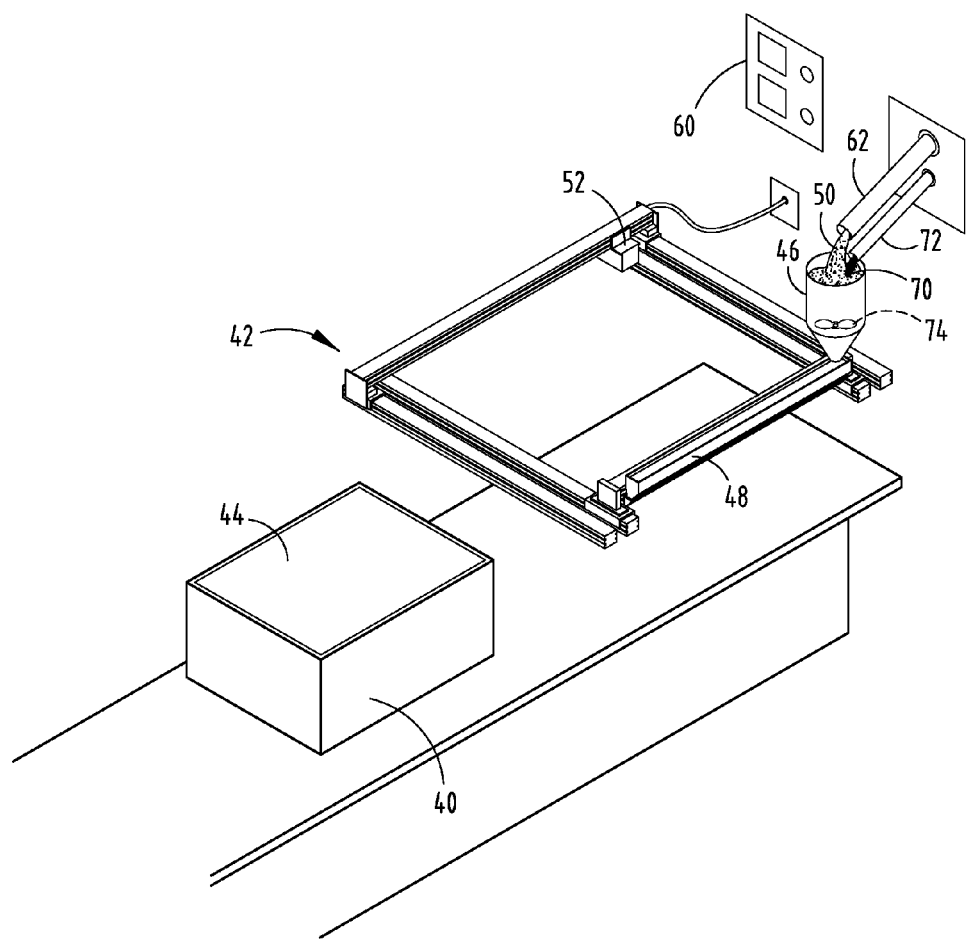
FIG. 1 is a top perspective view of a job box prior to the formation of sand mold packages by a sand mold printing device.
Figure 2:
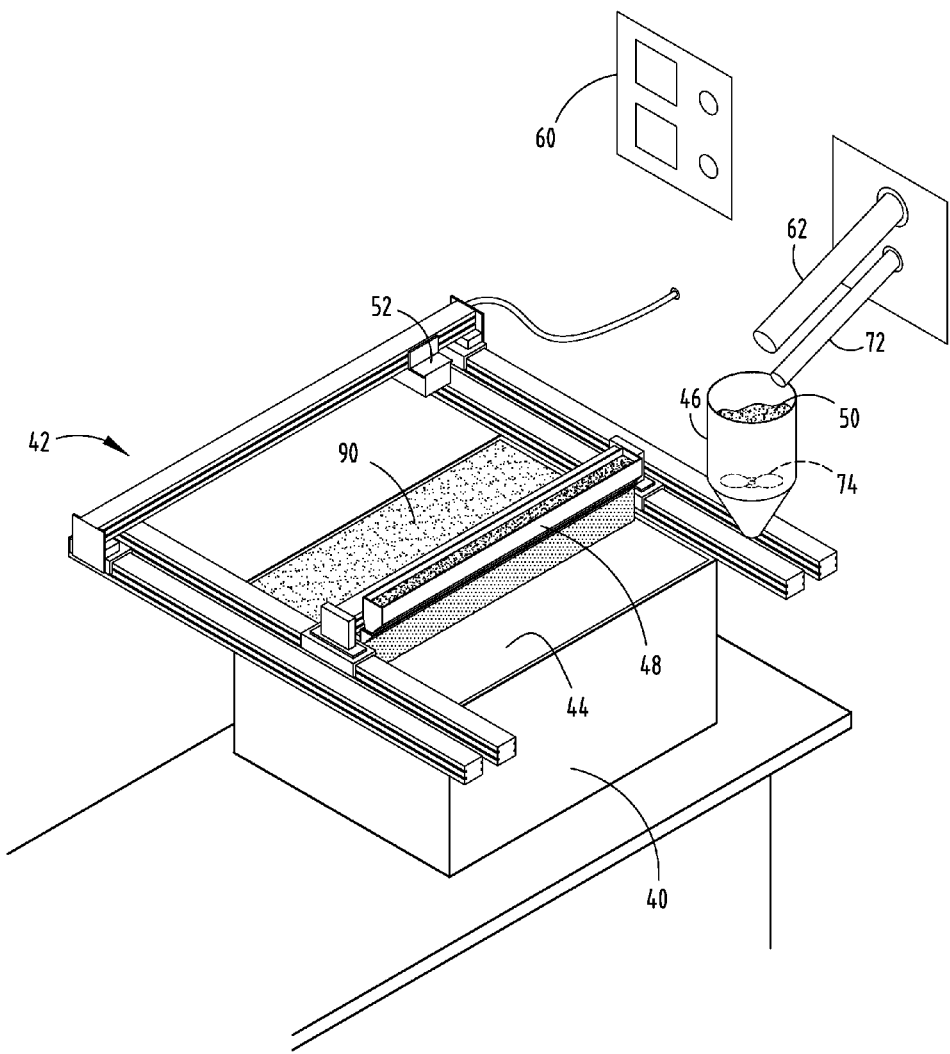
FIG. 2 is a top perspective view of a job box of FIG. 1 disposed in a printing area of the sandprinting device as a layer of fine particulate is being spread in the job box.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention uses an additive manufacturing technique to produce a mold package, and specifically, uses a sandprinting process to create a sand printed mold package. The printing of a sand mold package using a sandprinting device is generally initiated by acquiring a three-dimensional (3D) data design for a wheel assembly using a CAD model program. As further explained below, the 3D data design can be for a wheel assembly, and particularly, for a prototype wheel assembly, such that the data can be used to create a sand printed mold package that can be used to cast a prototype wheel assembly using a molten alloy. The sandprinting device is capable of printing various sand mold packages such that several different designs of prototype wheel assemblies can be created without the associated costs and workup time necessary to create a mold core package from blocks of metal using subtractive manufacturing techniques.

Referring now to FIGS. 1-6, a job box 40 formed from any number of materials, including wood, metal, etc., is positioned below a printing device 42. The job box 40 defines a print area 44 within which components of a mold core package will be formed from a plurality of stacked particulate layers, as further described below. The printing device 42 is capable of printing 3D molds, cores, inserts, mold core packages and other mold components for use in the present invention.

Figure 18:
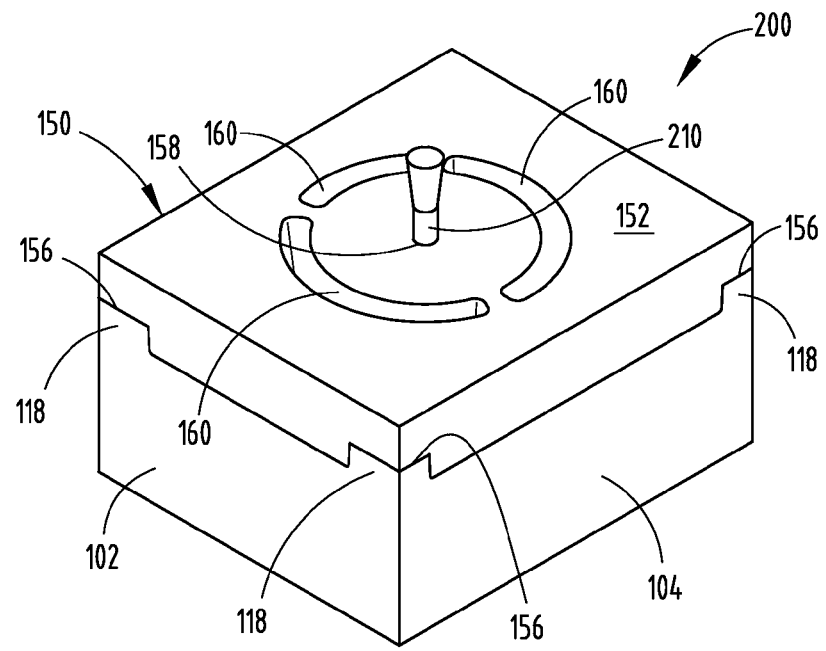
FIG. 18 is a top perspective view of an assembled sand mold package.

As used throughout this disclosure, the terms "mold package", "mold core package" or "sand mold package" will refer to sand printed molds that are ready for casting of a molten material. The term "molds" will refer to a component of a mold package and the term "cores" refers to an insert that is inserted into a mold package for displacing molten material as cast into the mold core package. Thus, the combination of sand printed molds and cores creates a mold core package used with a metal chill for casting a prototype wheel assembly. For purposes of the description of the formation of mold core packages or sand mold packages using the three-dimensional printing process discussed below, a sand mold package 200 as shown in FIG. 18 will be referenced for exemplary purposes only. It is to be understood that several different sand mold package components can be printed for casting other wheel assemblies and such sand mold package components can be printed simultaneously in a single printing process.

The printing device 42 includes a hopper 46 at a deposition trough 48, which lays a thin layer of activated fine particulate 50, such as silica sand, ceramic-sand mixes, etc., inside the print area 44. The particulate 50 may be of any size, including 0.002 mm to 2 mm in diameter. The printing device 42 also includes a binder deposition device or binder dispenser 52. As disclosed in detail below, the binder dispenser 52 sprays a thin layer of binder or binding agent 16 in a configuration or pattern 80 of a single layer of a desired sand printed mold component. Repetition of the layering of sand 50 and spraying of binding agent 16 by the binder dispenser 52 results in the production of a three-dimensional sand mold component comprised of a plurality of the stacked particulate layers. The 3D sand mold package is manufactured additively over a length of time sufficient to print each thin layer of the fine particulate 50 in succession, such that each layer of bound particulate is further bound to adjacent layers, to form a completed sand mold component. Each thin layer measures approximately 0.28 mm. A completed sand mold package made up of various sand printed components will ultimately be used as a sacrificial mold to fabricate or cast a metal part, such as the wheel assembly shown in FIG. 19.

With specific reference to FIG. 1, a computer-aided design (CAD) program is developed wherein the specific configuration of a sand mold package component 100 (FIG. 6A) is entered and loaded up on a computer 60, which is coupled to the printing device 42. The computer 60 feeds the information from the CAD program to the printing device 42 for formation of the sand mold components configured to cast a specific part.

It is contemplated that a CAD program, or any other form of 3D modeling software, can be used to provide sufficient information for the 3D printing device 42 to form the desired sand mold structure. Prior to activation of the 3D printing device 42, a predetermined quantity of the sand or fine particulate 50 is dispensed into the hopper 46 by a particulate spout 62 as shown in FIG. 1. An activation coating or activator 70 supplied by an activator spout 72 is also deposited into the hopper 46. Although the embodiments describe herein refer to sand layers, the fine particulate 50 may include any of a variety of materials or combinations thereof suitable for the additive manufacturing techniques disclosed herein. The sand 50 is mixed in the hopper 46 with the activator 70 by an agitator 74 or other known mixing device such that the sand 50 becomes thoroughly mixed and activated. After the sand 50 and activator 70 have been thoroughly mixed, the activated sand 50 is moved to the deposition trough 48.

Figure 3:
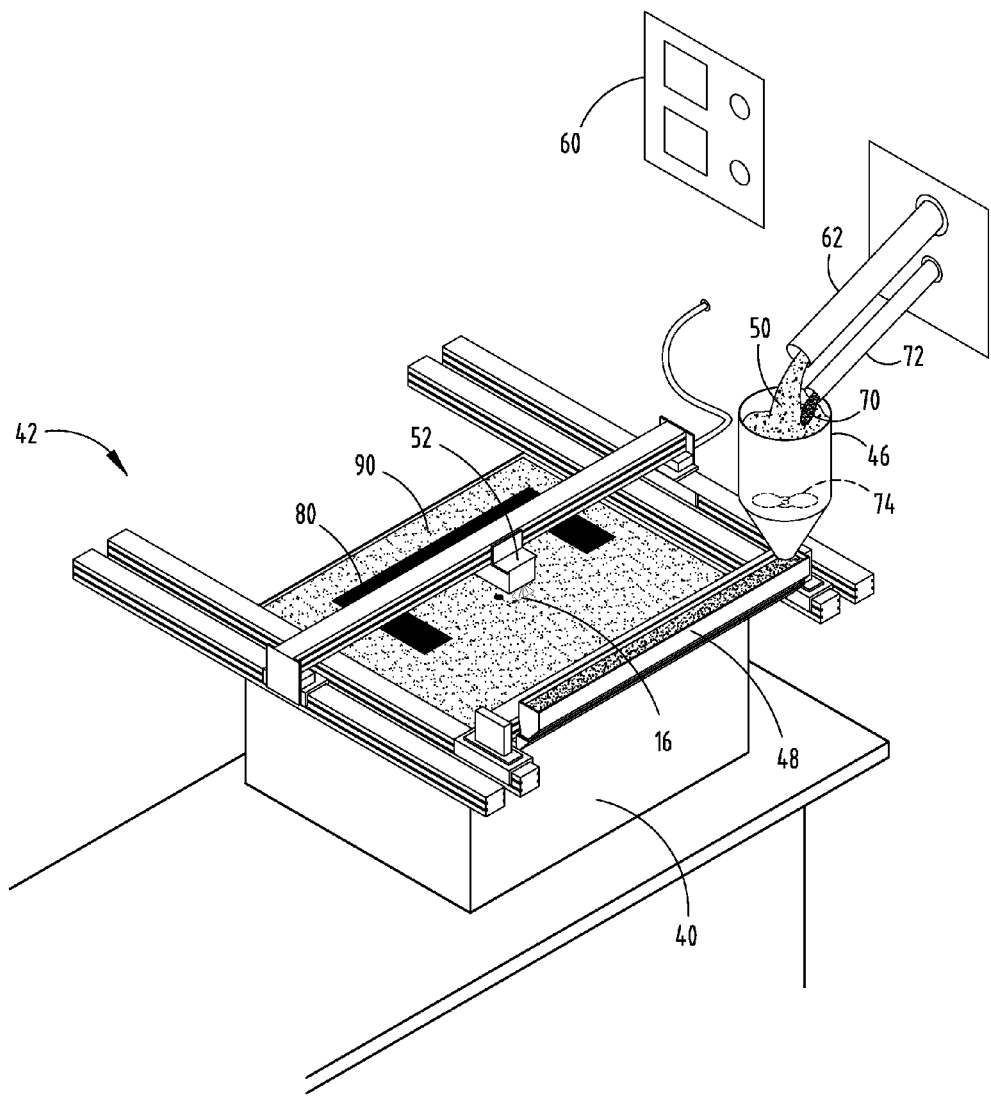
FIG. 3 is a top perspective view of the job box of FIG. 2 as a binder is being added to the fine particulate in the job box by a sandprinting device to form a cross-sectional layer of a sand mold package component.
Figure 4:
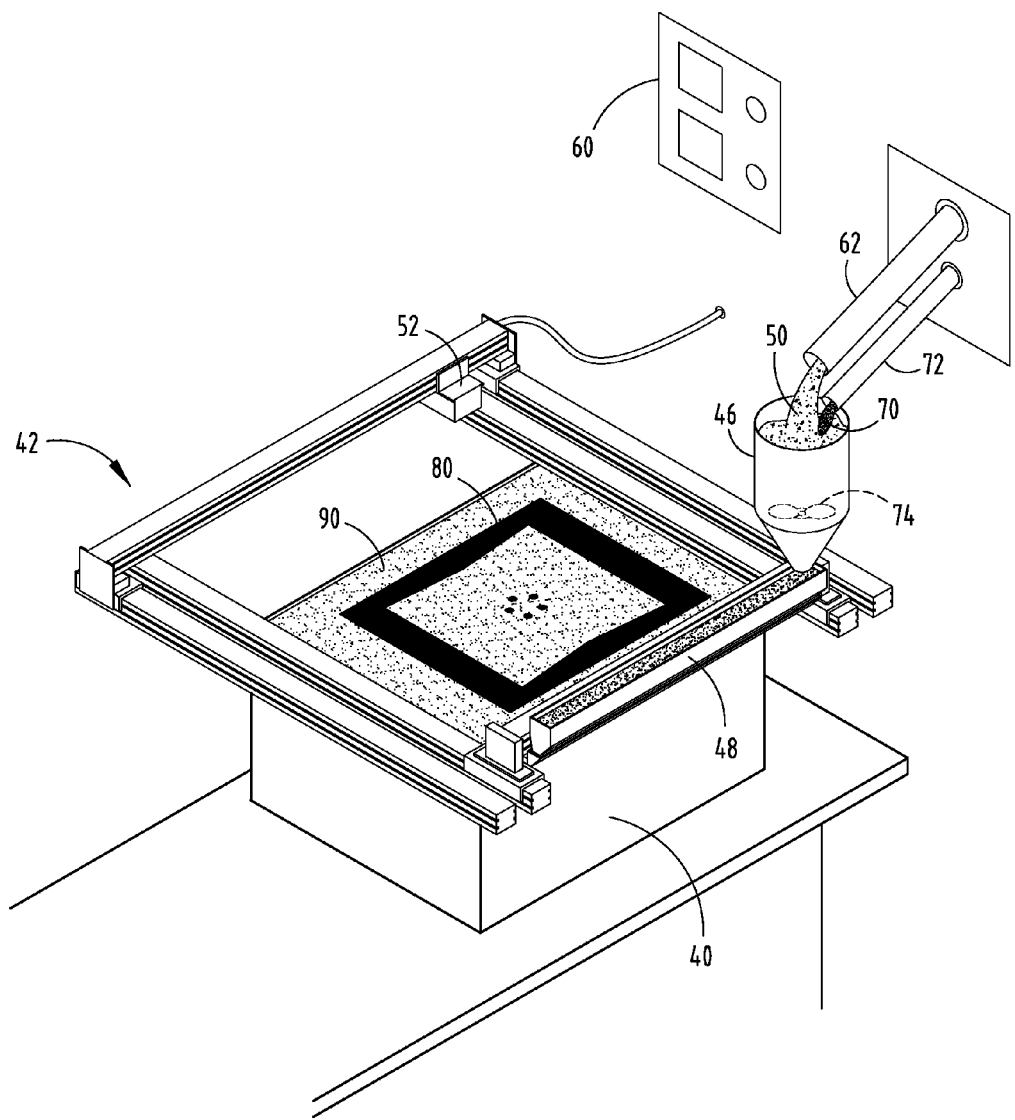
FIG. 4 is a top perspective view of the job box of FIG. 3 after several cross-sectional layers of sand have been printed in the job box by a sandprinting device.
Figure 5:
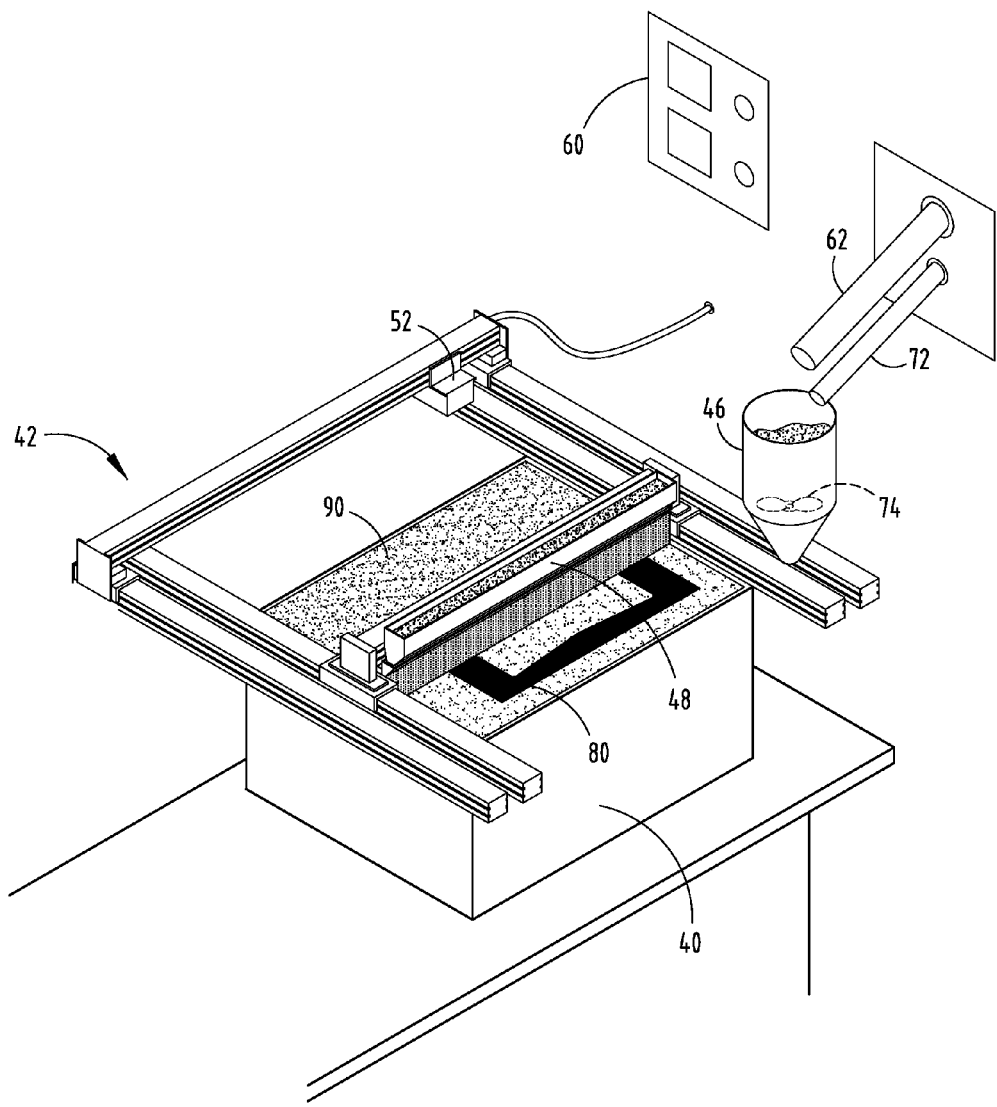
FIG. 5 is a top perspective view of the job box of FIG. 4 with a fresh layer of fine particulate being spread over the print surface of the job box.

Referring now to FIGS. 2-6, after the activated sand 50 has been moved to the deposition trough 48, the sand 50 is spread across the print area 44 by the deposition trough 48 to form a thin even layer of unbound sand 90. After being spread in a thin layer on the print area 44 in the job box 40, the activated fine particulates 50 are sprayed with the binder or binding agent 16 (FIG. 3). The binding agent 16 is dispensed from the binder dispenser 52, which sprays a thin layer of the binding agent 16 in a CAD specified pattern 80 that represents a first thin cross-sectional layer of the desired sand mold component as exemplified in FIGS. 6A and 7 as component 100. After the binding agent application is complete (FIG. 4), another mixture of sand 50 and activator 70 is prepared and deposited into the deposition trough 48. The deposition trough 48 then dispenses another layer 90 of unbound activated sand 50 over the previously spread sand layer in the job box 40, as shown in FIG. 5. The binder dispenser 52 passes over the print area 44 again, spraying a thin layer of the binding agent 16 in the pattern 80 that represents a second thin cross-sectional layer of the desired sand mold components adjacent to the first thin cross-sectional layer. These steps are repeated several times until every thin cross-sectional layer of the completed sand mold component 100 (FIG. 7) has been printed. Using this additive manufacturing technique, virtually any shape of a sand mold component can be formed. Further, a completed sand mold package produced using 3D sandprinting can have internal structural features that cannot otherwise be created by known subtractive methods.

Figure 6:
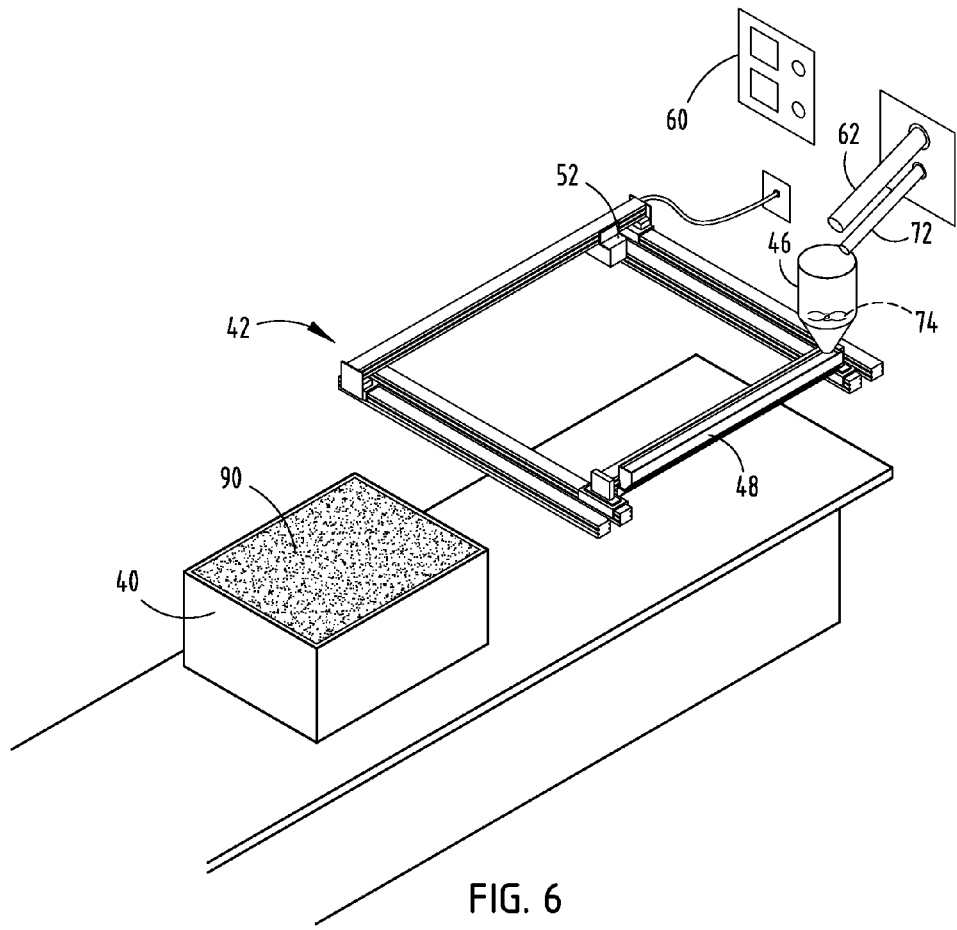
FIG. 6 is a top perspective view of the job box of FIG. 5 after a sand mold package component has been printed and the job box has been removed from the printing area of the printing device.
Figure 6A:
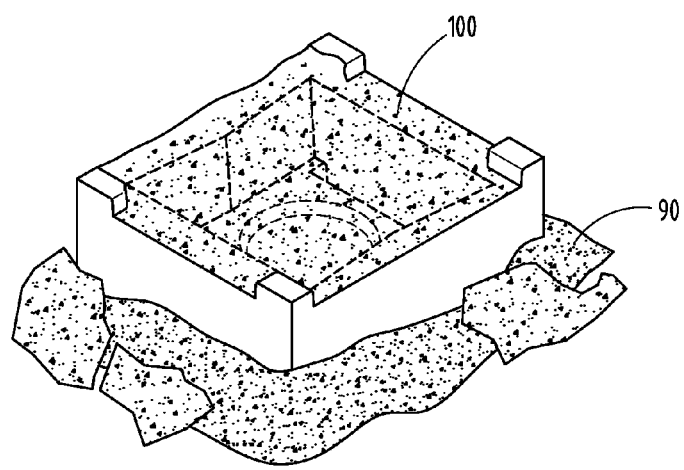
FIG. 6A is a perspective view of the sand mold package component of FIG. 6 as removed from the job box, wherein the sand mold package component is a drag mold assembly made from bound sand, and further wherein excess unbound sand is being removed from the drag mold assembly.

As shown in FIG. 6, the job box 40 has a layer of unbound sand 90 disposed on top and the sandprinting process is complete. Thus, the job box 40, as shown in FIG. 6, contains a sand printed mold component therein. As shown in FIG. 6A, the sand printed mold component 100 has been removed from the job box 40 and unbound sand 90 is being removed to reveal mold component 100.

Figure 7:
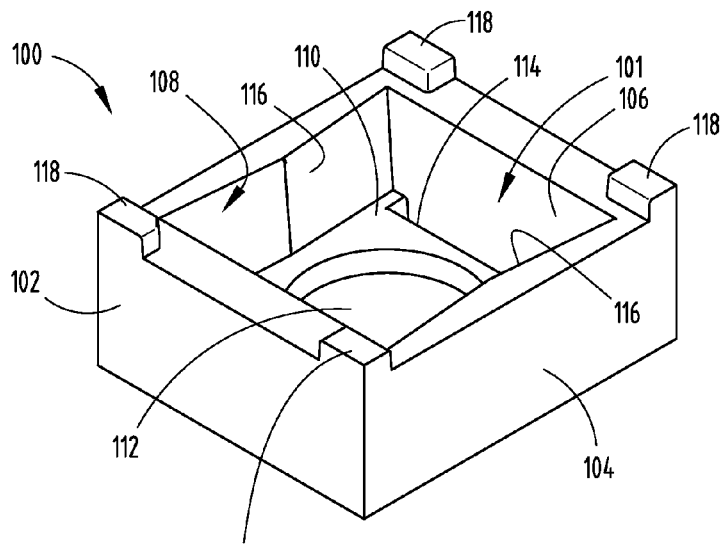
FIG. 7 is a top perspective view of the drag mold assembly of FIG. 6A with the excess unbound sand removed.
Figure 8A:
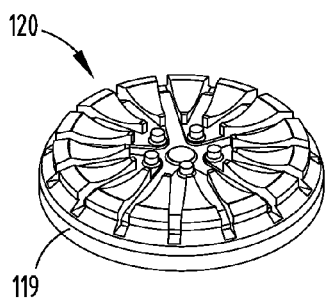
FIGS. 8A-8C are top perspective views of various chill plate designs for use with the present invention.

Referring now to FIG. 7, the component printed using the sand technique described above is a drag mold 100 which is generally rectangular in configuration having side walls 102, 104, 106 and 108 and a bottom wall 110. A chamber 112 is disposed on bottom wall 110 and is configured to accept a base portion of a metal chill as further described below. The bottom wall 110 further comprises guide channels 114 which are disposed at the intersection of bottom wall 110 and side walls 106 and 102. Side walls 104 and 108 comprise angled inner walls 116 used to guide and properly align side cores which will be disposed within a cavity 101 created by the side walls 102, 104, 106 and 108 of the drag mold 100. In the embodiment shown in FIG. 7, alignment features or guide members 118 are disposed in the upper four corners of the drag mold 100 and are used to align the drag mold 100 with a cope mold to form an assembled sand mold package. As shown in FIG. 7, the sand printed chamber 112 is in the form of a circular depression for accepting base portion of a metal chill having a circular base portion. The exemplary circular pattern for chamber 112 shown in FIG. 7 is a reciprocal pattern of a base portion 119 of a chill plate 120 as shown in FIG. 8A. In assembly, the chill plate is inserted into the cavity 101 of the drag mold 100 in creating the sand mold package and the base portion 119 of the chill 120 is further nested within chamber 112.

Figure 8B:
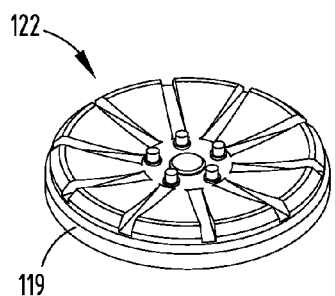
Figure 8C:
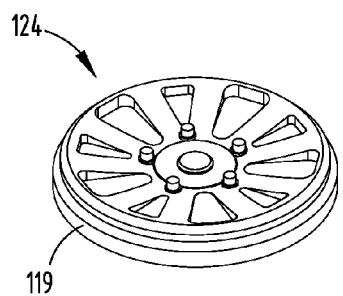

As shown in FIGS. 8A-8C, various designs for chill plates (120, 122, 124) are shown which, in assembly, form specific designs for the disk area of prototype wheel assemblies.

In assembly, the chamber 112 formed on the bottom wall 110 of the drag mold 100 provides a chill support cavity for a base chill, such as the chill plates depicted in FIGS. 8A-8C. The base chill is formed from a metal material having a high heat conductivity such that when assembled in a mold package, the base chill 120 will cause for directional solidification of a molten material as cast in the mold package. Appropriate metals used to form the base chill include iron, copper, bronze, aluminum, graphite, and other such materials with high heat capacity and thermal conductivity. The process for directional solidification of a molten material to form a cast wheel assembly will be further described below.

Figure 9:
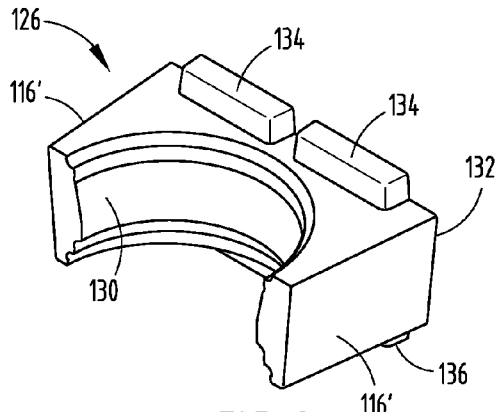
FIGS. 9 and 10 are top perspective view of sand printed side core mold components.
Figure 10:
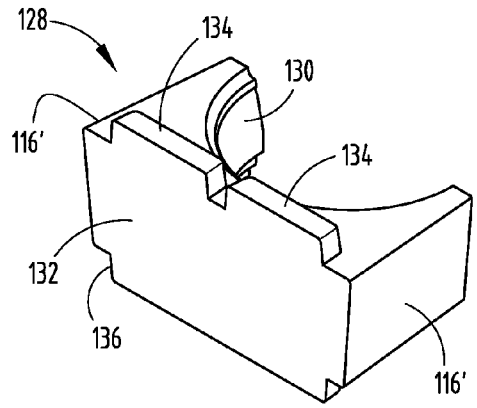
Figure 16:
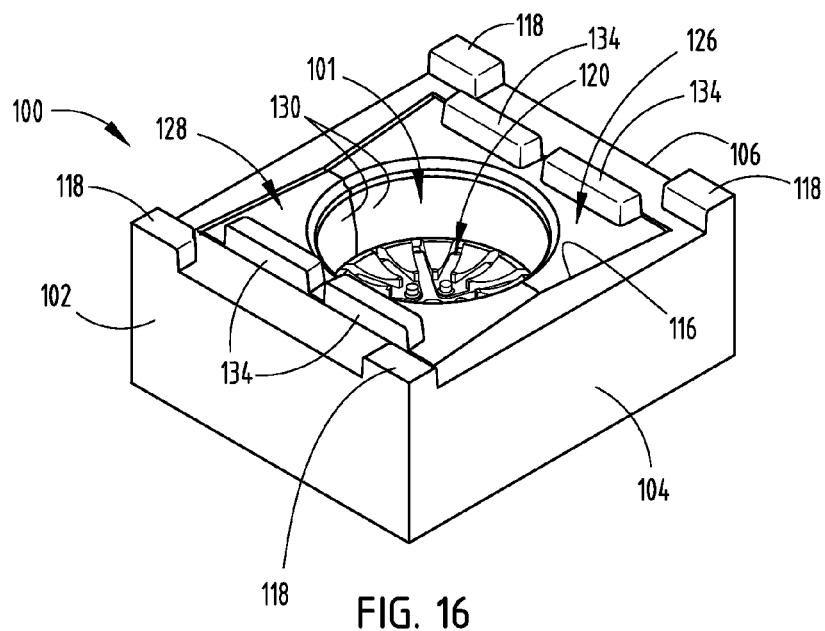
FIG. 16 is a top perspective view of the sand printed drag mold component.
Figure 16A:
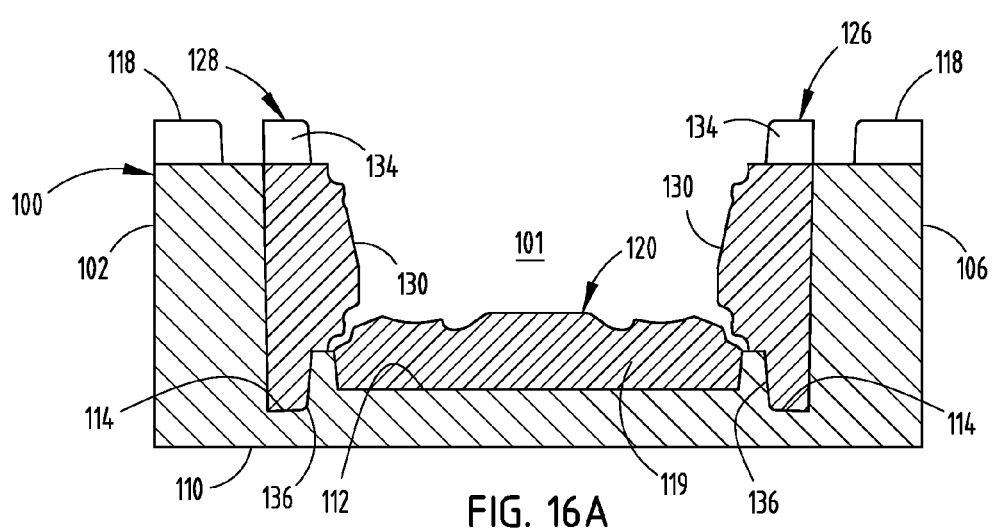
FIG. 16A is a cross-sectional view of the sand printed drag mold component of FIG. 16 having side cores and a chill plate disposed therein.

As shown in FIGS. 9 and 10, side cores 126 and 128 are configured to be placed within the cavity 101 of the drag mold 100 shown in FIG. 7. Each of the side molds, or side cores 126, 128 comprise angled side walls 116' which are configured to align with angled walls 116 of the drag mold 100. The angled or tapered inner portions 116 of side walls 108 and 104 of the drag mold 100 and the angled or tapered outer side walls 116' of the side cores 126, 128 provides for accurate and efficient construction of the mold core package in assembly. The side cores 126, 128 further comprise arcuately shaped inner side walls 130 which will form the side walls of the mold cavity for the rim portion of the wheel assembly as further described below. In the embodiments shown in FIGS. 9 and 10, the side molds 126, 128 have flat back portions 132 having upper guide members 134 and lower guide members 136. To ensure accurate assembly of the mold core package, the lower guide members 136 correspond to the guide channels 114 disposed on the bottom wall 110 of the drag mold 100 as shown in FIG. 7. The upper guide members 134 correspond to guide channels disposed in a cope mold assembly as further described below. The side molds 126, 128 are produced using the additive manufacturing technique of printed sand layers described above with reference to the formation of the drag mold assembly 100. In assembly, the side molds 126, 128, as shown in FIG. 16, are fully disposed within the cavity 101 of the drag mold assembly 100.

Figure 11:
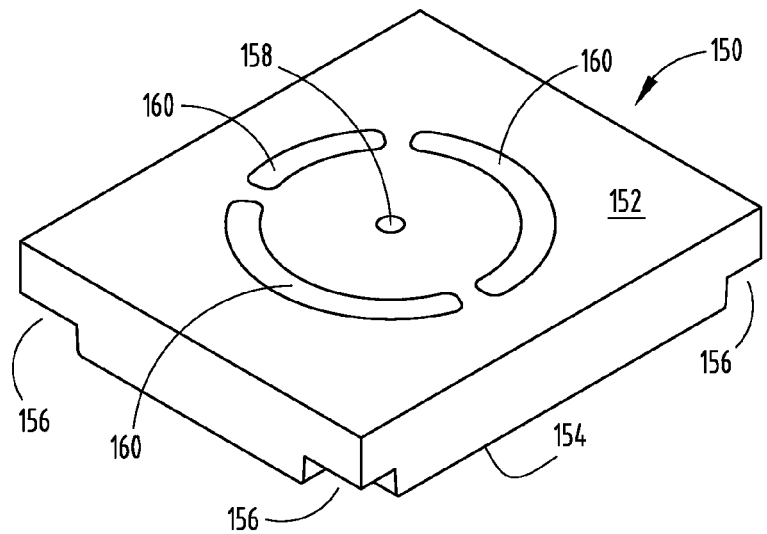
FIG. 11 is a top perspective view of a sand printed cope mold component.
Figure 12:
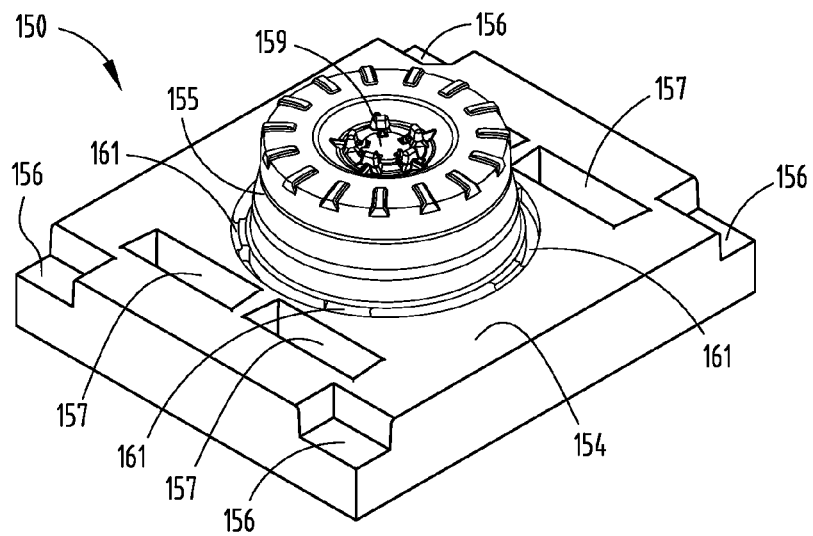
FIG. 12 is a bottom perspective view of the cope mold component of FIG. 11.

Referring now to FIG. 11, a cope mold assembly 150 is shown having a generally rectangular shape with an upper surface 152 and a lower surface 154. The lower surface 154 has a generally inverted frustum shaped projection 155 as shown in FIG. 12 which, in assembly in a mold core package, forms the inner side walls of the rim portion of the wheel assembly. The cope mold assembly 150 is formed using a sandprinting technique similar to the techniques described above. The cope mold assembly 150 is formed with guide chambers 156 disposed on its lower surface 154 in the outer corners of the lower surface 154. In assembly, the guide chambers 156 align with and engage guide members 118 disposed on the upper surface of the drag mold assembly 100, such that the guide members 118 of the drag mold 110 (FIG. 7) are received in the guide chambers 156 when the mold core package is assembled. The cope mold assembly 150 has an inlet port 158 disposed on its upper surface 152 through which a molten material is either gravity fed or injected in a low pressure injection process into the mold cavity of the mold package as further described below. The cope mold assembly 150 has apertures 160 disposed on the upper surface 152 which correspond to risers formed in the mold cavity and used in the casting process as further described below.

Figure 13:
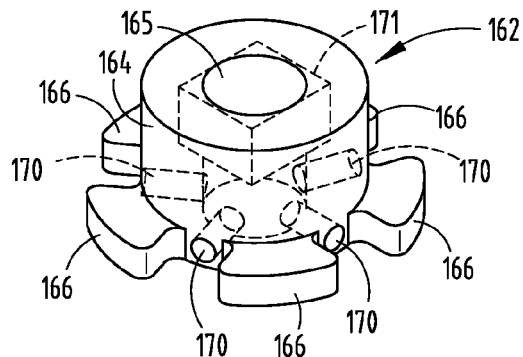
FIG. 13 is a top perspective view of a gate.

Referring now to FIG. 13, a gate 162 is shown having a generally circular shaped body portion 164 with spoke portions 166 extending orthogonally from the circular or cylinder shaped body portion 164. In assembly, the gate 162 helps to disperse and filter molten material as it is poured into the mold cavity. The gate 162 includes an upper opening or aperture 165 that includes a ceramic filter 171. Opening 165 is in fluid communication with exit ports 170 disposed between spokes 166. The gate 162 is disposed between the cope mold 150 and drag mold 100 as shown in FIGS. 17A and 18A in assembly.

Figure 14:
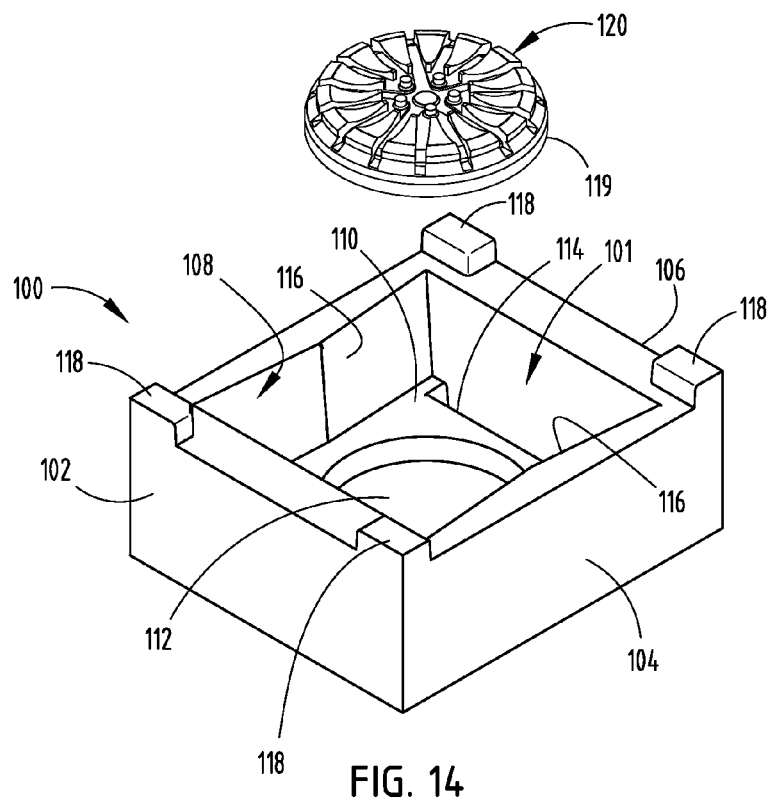
FIG. 14 is a top perspective view of a chill plate to be inserted into a sand printed drag mold component.
Figure 14A:
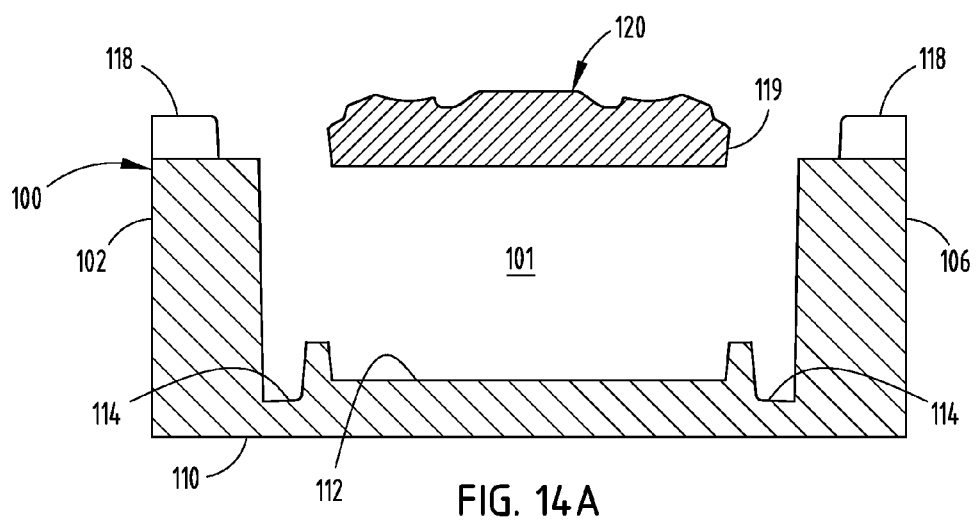
FIG. 14A is a cross-sectional view of the chill plate and sand printed drag mold component of FIG. 14.

Referring now to FIGS. 14-18A, a sand printed mold core package 200 (FIG. 18) is assembled and will be now be described. In assembly of the mold package 200, a metal base chill, exemplified as chill 120 as shown in FIG. 14, is inserted into the cavity 101 of the drag mold 100. The chill plate is supported on the chill plate support chamber 112 disposed on a bottom wall 110 of the drag mold 100. In assembly, the drag mold 100 is commonly referred to as the bottom or lower mold. As shown in FIG. 14A, a cross-sectional view of the drag mold 100 and the metallic base chill 120 are shown where it can be seen that the support chamber 112 of the bottom wall 110 of the drag mold 100 is specifically sand printed to correspond to the cross-section of the base portion 119 of the metal base chill 120, such that the base chill 120 is fully supported and nested within chamber 112 of the drag mold 100 in assembly.

Figure 15:
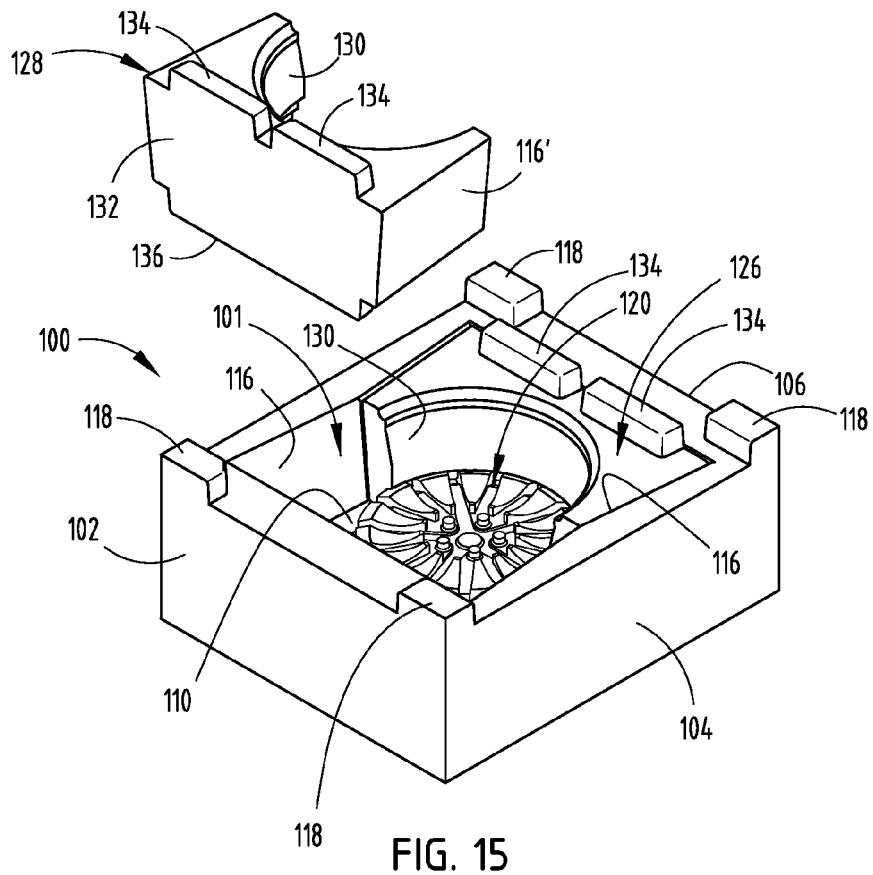
FIG. 15 is a top perspective view of a sand printed drag mold component having a chill plate and a side core disposed thereon with another side core to be received in the sand printed drag mold component.
Figure 15A:
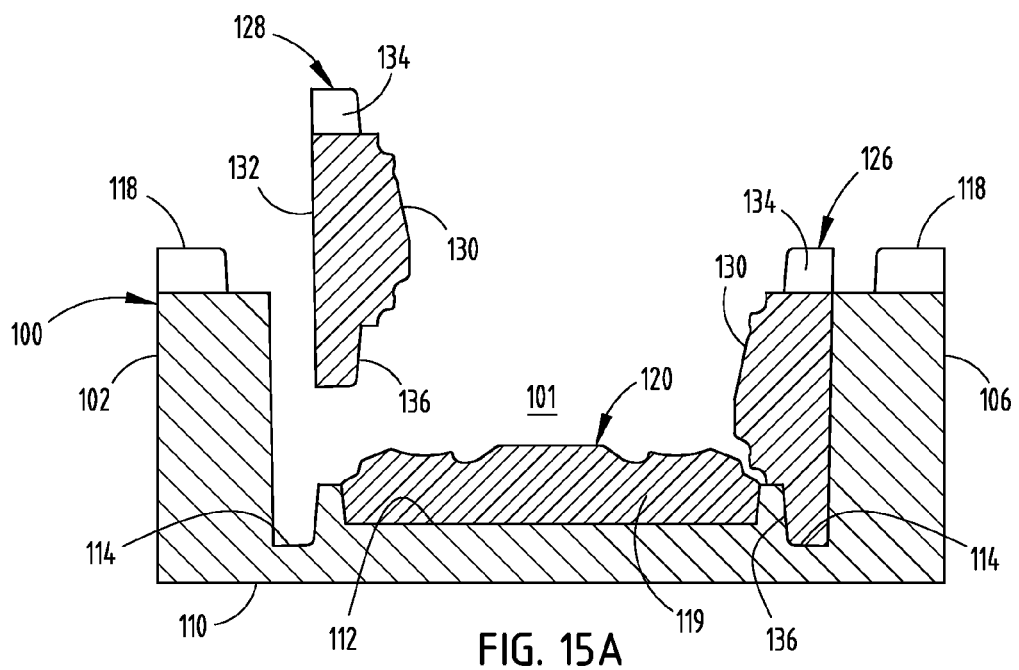
FIG. 15A is a cross-sectional view of the sand printed drag mold component and side cores along with the chill plate as shown in FIG. 15.

Referring to FIGS. 15 and 15A, the side molds or side cores 126, 128 are inserted into the cavity 101 of the drag mold 100. The curved inner surfaces 130 of the side molds 126, 128 align with one another and surround the metal base chill 120 in assembly. As shown in FIG. 15, the angled side walls 116' align with the angled inner side walls 116 of the drag mold 100, such that the side cores 126, 128 easily fit into place and are quickly assembled in the drag mold 100. Further, guide members 136 disposed on the lower end of rear wall 132 of the side molds 126, 128 are received in the guide channels 114 disposed on the bottom wall 110 of the drag mold 100 as best shown in FIG. 15A. In this way, the side molds 126, 128 are securely situated within the cavity 101 of the drag mold 100. The guide members 136 of the side molds 126, 128 being engaged in the guide channels 114 of the drag mold 100 ensures that the side molds 126, 128 are properly situated for the forming of a mold cavity for the casting of a wheel assembly.

Figure 17:
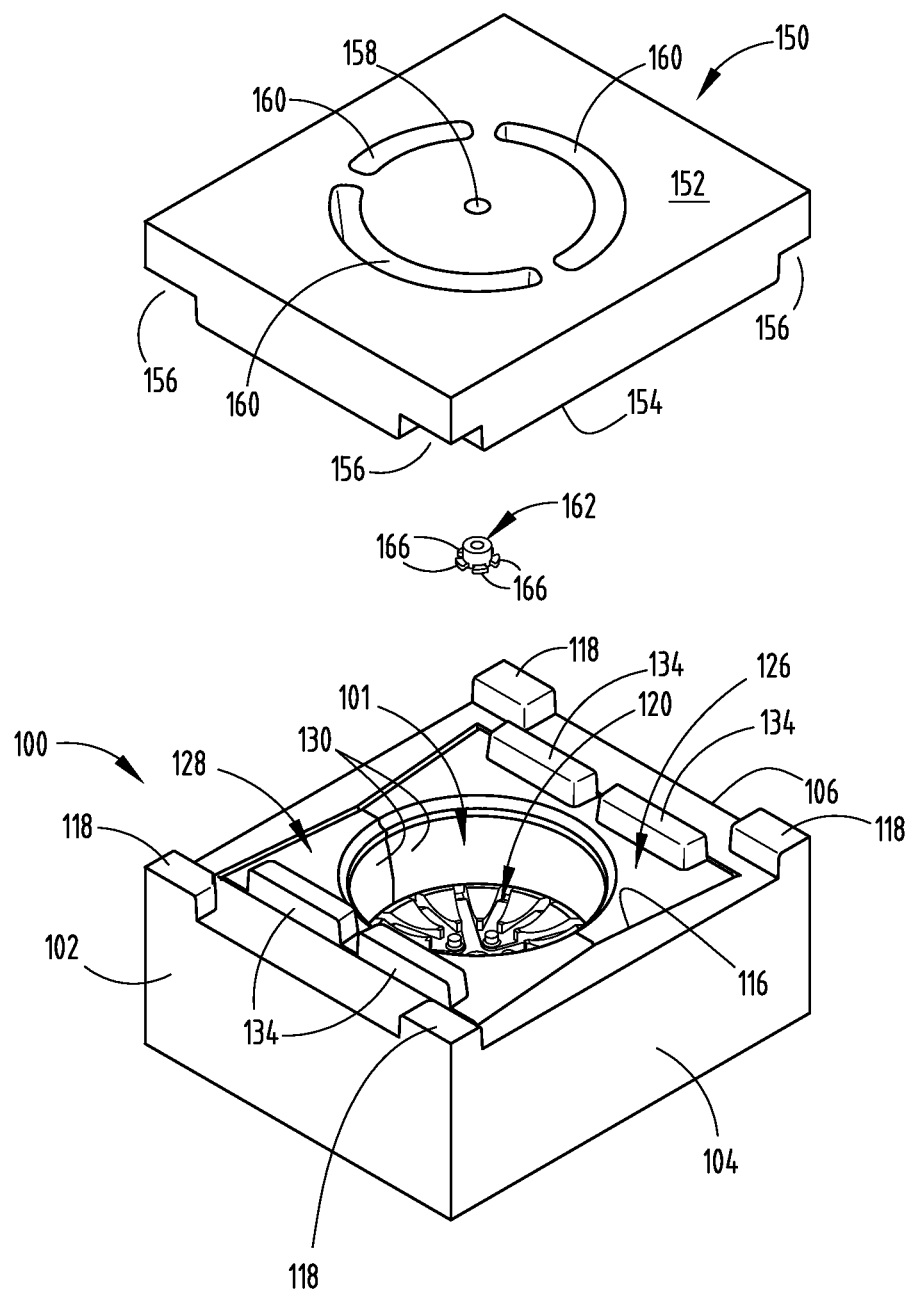
FIG. 17 is an exploded view of a sand mold package having sand printed cope and drag mold components.
Figure 17A:
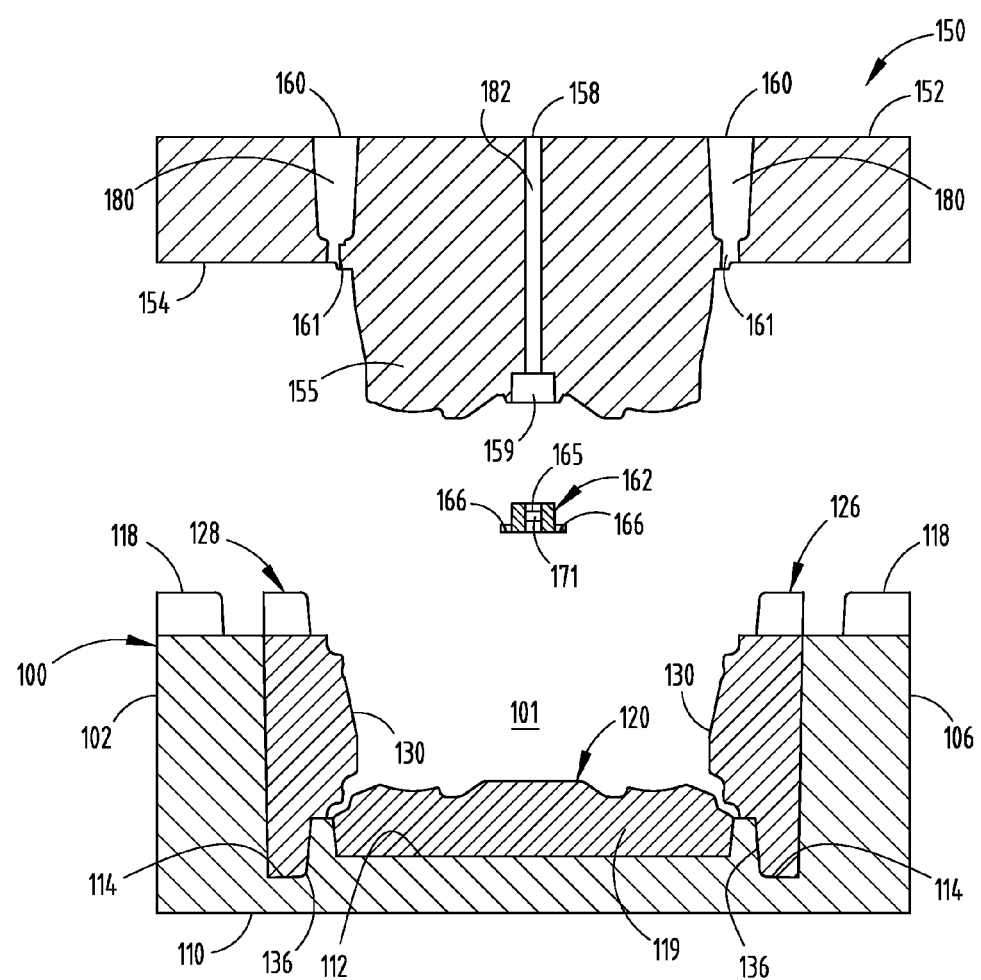
FIG. 17A is a cross-sectional view of the exploded sand mold package of FIG. 17.
Figure 18A:
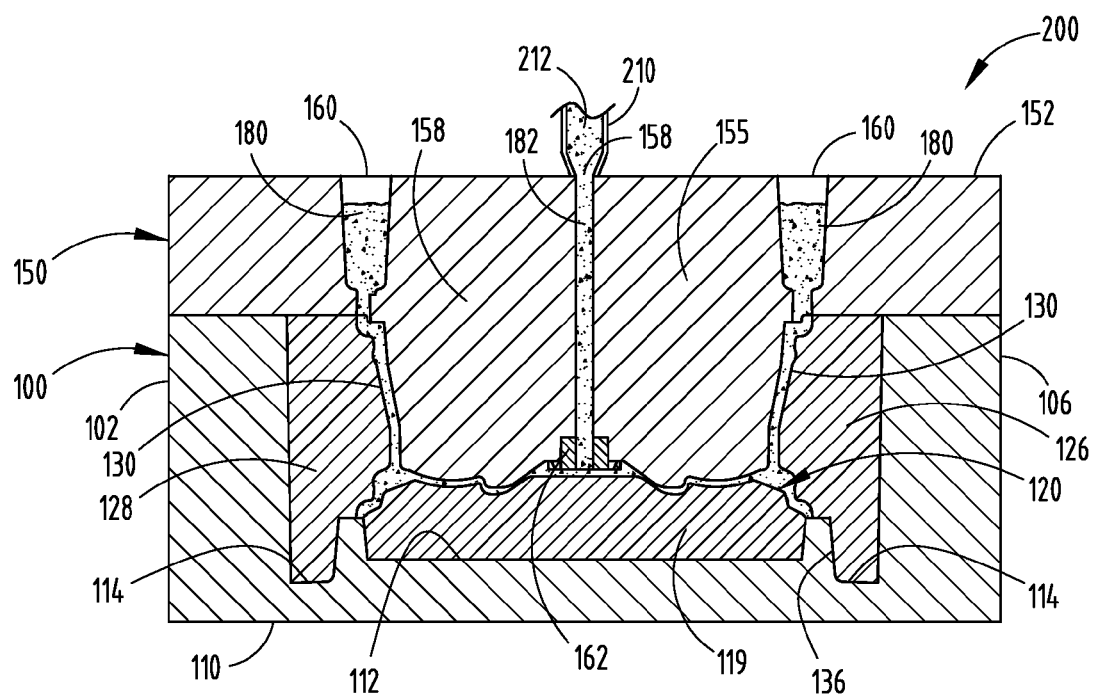
FIG. 18A is a cross-sectional view of the assembled sand mold package of FIG. 18.

Referring now to FIGS. 17-18A, a mold package 200 (FIG. 18) is fully assembled with the cope mold 150 being fitted on the drag mold 100. The gate 162 is also inserted into the cavity 101 of the drag mold 100 as shown in FIG. 17. In assembling the cope and drag molds 150, 100, guide members 118 disposed on the outer corners of the upper surface of the drag mold 100, align with and engage guide chambers 156 disposed on the outer corners of lower surface 154 of the cope mold 150. In this way, the cope mold 150 is properly situated on the drag mold 100 to precisely form a mold cavity. Further, guide members 134 disposed on upper surfaces of side molds 126, 128 are aligned with and engage guide chambers 157 disposed on the lower surface 154 of the cope mold 150 as shown in FIG. 12. The alignment and engagement of guide members 134 of the side molds 126, 128 with the guide chambers 157 of the cope mold 150 further assures proper assembly of the mold cavity for casting a wheel assembly as further described below.

As shown in FIG. 17A, the frustum projection 155 of the cope mold 150 is prepared to be inserted in to the cavity 101 of the drag mold 100. The cope mold further includes apertures 161 disposed on the lower surface 154 of the cope mold 150. Apertures 160 disposed on the upper surface 152 of the cope mold 150 are in communication with apertures 161 such that risers 180 are internally formed within the cope mold 150 and are used in the casting of the molten material as further described below. As noted above, the risers 180 are in fluid communication with a mold cavity where a wheel is cast. The cope mold further includes a sprue 182 which is disposed between inlet or access port 158 disposed on the upper surface 152 of the cope mold 150 and aperture 159 disposed on a lower portion of the frustum protrusion 155 of the lower surface 154 of the cope mold 150. In casting a wheel assembly, molten material is poured in the access port 158 and travels through the sprue 182 of the cope mold 150 to fill the mold cavity. As shown in FIG. 17A, aperture 159 disposed on the frustum shaped protrusion 155 is adapted to engage the gate 162 in assembly. As further shown in FIG. 17A, and as noted above, the gate 162 further comprises an aperture 165 extending there through to exit ports 170 for the dispersion of molten material in a casting process.

As shown in FIGS. 18 and 18A, a sand printed mold core package 200 is shown wherein the cope mold 150 and drag mold 100, commonly referred to as upper and lower mold forms, are assembled together to form a mold cavity 220, as shown in FIG. 18A, having a near net shape of a wheel assembly to be cast. As shown in FIG. 18, the guide members 118 of the drag mold 100 are nested within the guide chambers 156 of the cope mold 150. As further shown in FIG. 18, a pouring cup 210 is positioned in communication with aperture or inlet port 158 disposed on the upper surface 152 of the cope mold 150, wherein the pouring cup 210 is used for the casting of a molten material into the mold core package 200. As shown in FIG. 18A, molten material 212 is gravity fed or injected under low pressure into pouring cup 210 such that the molten material 212 enters the mold core package 200 at aperture or inlet port 158 of the cope mold 150 and travels through the sprue 182 down to the mold cavity 220 as indicated by the arrows shown in FIG. 18A. The mold cavity or casting cavity 220 of the mold core package 200 is generally defined on an interior side by the frustum projection 155 extending downwardly from the lower surface 154 of the cope mold 150. The exterior portion of the mold cavity or casting cavity 220 is generally defined by the arcuate side walls 130 of the side molds 126, 128 and further defined by the base chill 120 disposed on a lower surface of the mold cavity 220.

As indicated in FIG. 18A, the molten material 212 travels from the inlet port 158 through the sprue 182 to a hub casting cavity H of the mold cavity 220. The molten material 212 is generally considered a molten metal material such as a molten aluminum alloy used for casting alloy wheels. For example, the molten aluminum alloy can be aluminum alloy A356 which is generally poured at a temperature of 730° C. While the A356 aluminum alloy is an exemplary alloy used in casting prototype wheels using the sand printed mold packages of the present invention, this alloy is only provided for exemplary purposes and not meant to limit the scope of the present invention. It is noted that any generally lightweight metal alloy can be used for casting such as aluminum or magnesium. From the hub casting cavity H of the mold cavity 220, the molten material 212 generally travels into a disk casting cavity for casting the disk portion of a wheel assembly. The casting cavity for the wheel disk is represented by left and right casting cavities $D_1$ and $D_2$ in FIG. 18A and will generally comprise spaced apart spokes in the final wheel casting. The disk casting cavities $D_1$ and $D_2$ make up one unitary cavity in assembly and are generally defined by the contours of the upper surface of the base chill 120 and the contours of the lower surface 153 of the frustum projection 155 of the cope mold 150. Further, the lower surface 153 of the frustum projection 155 can have a wheel disc pattern disposed thereon that correlates to the pattern disposed on the base chill 120 used in a casting process such that the lower surface 153 of the frustum projection 155 provides an interior molding cavity wall defining a particular wheel disc pattern.

After filing the disk casting cavity, the molten material 212 then generally travels as indicated by the arrows in FIG. 18A to the side wall casting cavities $S_1$ and $S_2$. As the molten material 212 fills the side wall casting cavities $S_1$, $S_2$, the molten material 212 proceeds to a lower bead seat casting area LB and further onto a lower flange casting area LF. The molten material 212 then proceeds upward to annular rim casting cavities $R_1$ and $R_2$ to upper bead seat casting areas UB and upper flange casting areas UF and finally to risers 180 disposed within the cope mold assembly 150. In this way, the molten material 212 fills the mold cavity 220 generally from the bottom of the mold cavity at the hub casting cavity H and the lower flange LF and lower bead seat LB area up through the annular rim casting sections $R_1$, $R_2$ to the cavities of the risers 180. Casting areas UB and LB of the mold cavity 220 used for creating upper and lower bead seats make for projections which extend radially outward on the rim portion of a cast wheel for seating a tire on the cast wheel. The casting cavities UF and LF that make up the upper and lower flanges disposed on either side of the rim portion are used to retain a vehicle tire on the cast wheel.

Figure 18B:
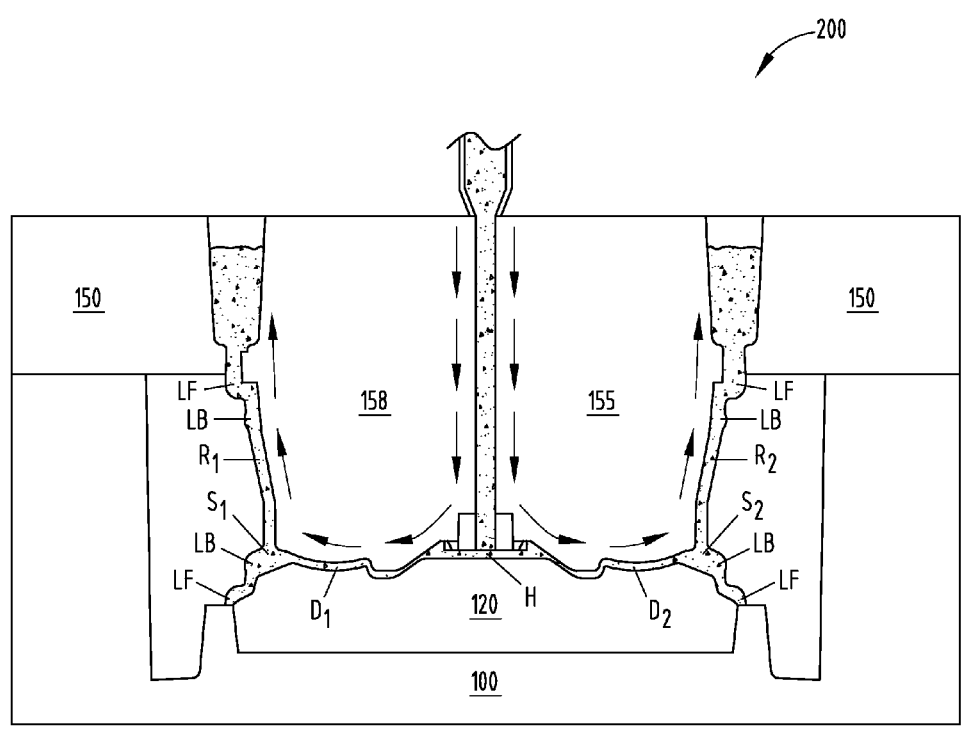
FIG. 18B is a fragmentary cross-sectional view of the assembled sand mold package of FIG. 18.

Referring to FIGS. 18A and 18B, the metal base chill 120 serves to provide a starting point for solidification of the molten material 212 as cast. As shown in FIG. 18B, the solidification of the molten material 212 is a directional solidification starting at the metal base chill 120 and proceeding upward towards the annular rim cavity $R_1$ as well as simultaneously proceeding axially along the disk casting cavity $D_1$ towards the hub casting cavity H. The directional solidification provided by the base chill reduces the cooling time of the cast wheel and provides for a finer grain size in the final cast wheel. The final cast wheel will also have reduced porosity as compared to casting procedures of the prior art which do not allow for directional solidification. The directional solidification provided by the base chill 120 is generally brought about by the high heat capacity and thermal conductivity of the base chill 120. In this way, the base chill 120 can absorb high amounts of heat from the molten material 212, such that the molten material 212 cools and begins solidification from a starting point of the base chill 120 and directionally upward through the rim casting cavity $R_1$ and axially across the wheel disk casting cavity $D_1$ towards the hub casting cavity H. The molten material is cast into the sand printed mold package 200 until the molten material 212 can be seen in the risers 180. The risers contain molten material that is used to fill spaces created in the cast wheel in the rim casting cavity $R_1/R_2$ as the molten material solidifies and shrinks. In this way, the cast wheel components have a reduced porosity as molten material is readily available in the risers to fill any voids caused by solidification or shrinkage during the casting process. In a similar way, the sprue 182 (FIG. 18A) provides a readily available supply of molten material 212 to fill any spaces or voids caused by shrinkage or contraction in the solidification of the molten material 212 at the hub casting cavity H. Thus, as the user casts a prototype wheel assembly, the inlet port 158 and risers 180 will generally let the user know if there is enough molten material 212 to fully cast the wheel assembly. As the molten material 212 settles and solidifies, the level of molten material in the risers and sprue area will decrease until the wheel assembly is fully solidified. Therefore, the risers 180 are generally large such that material cast therein will remain in a fluid molten form for use in filling voids in the solidifying cast wheel assembly as needed.

Figure 18C:
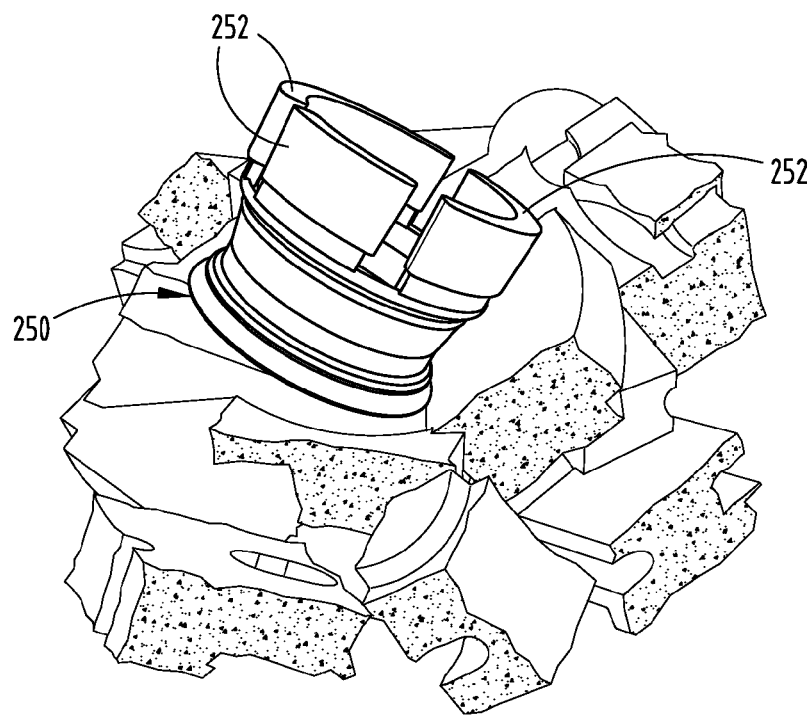
FIG. 18C is a top perspective view of the sand mold package of FIG. 18 being broken away to reveal a cast part.
Figure 18D:
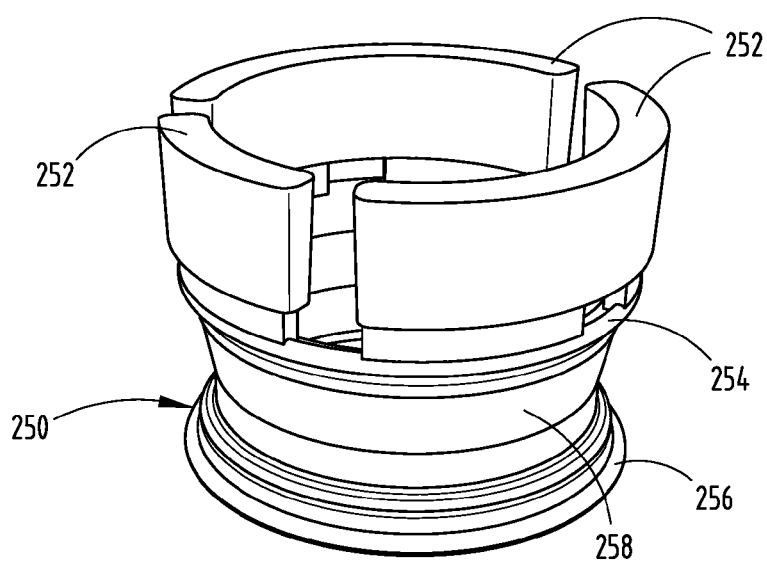
FIG. 18D is a top perspective view of a cast wheel assembly as removed from the sand mold package.

As shown in FIG. 18C, once the molten material has solidified, the sand mold package 200 is broken away to reveal a cast part 250, which is exemplified herein as a cast wheel assembly 250. As shown in FIG. 18D, the cast part 250 still contains the solidified material 252 which was once disposed within the risers portions 180 of the sand printed mold package 200. The solidified material 252 is generally machined off the wheel assembly 250.

Figure 19:
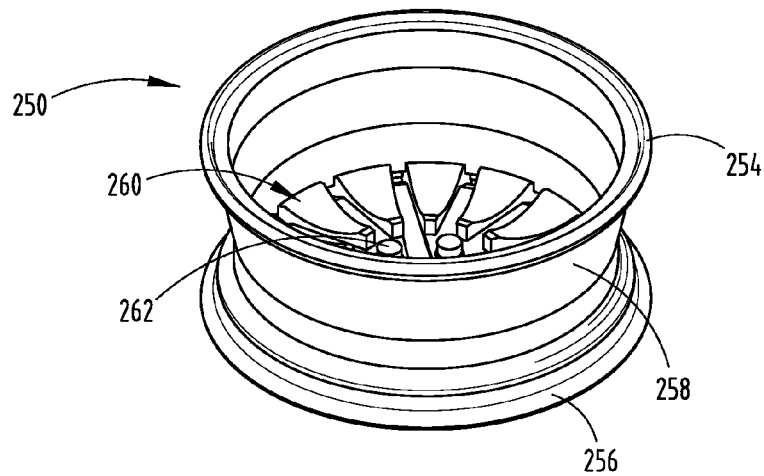
FIG. 19 is a top perspective view of a cast wheel assembly.
Figure 20A:
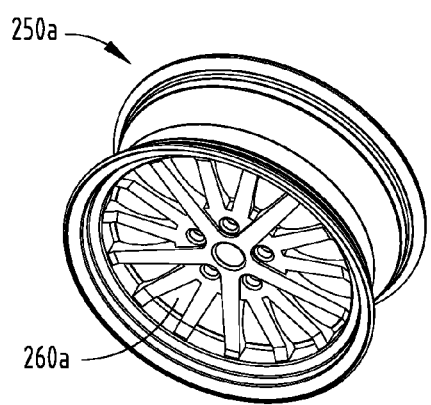
FIGS. 20A-20C are side perspective views of various cast wheel assembly designs.
Figure 20B:
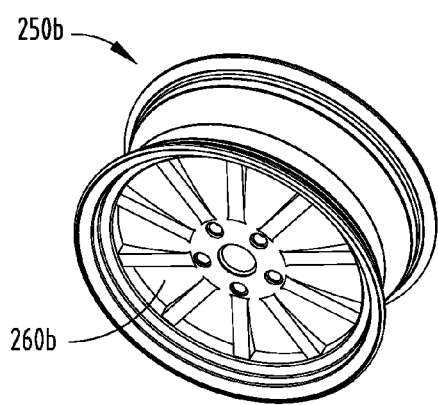
Figure 20C:
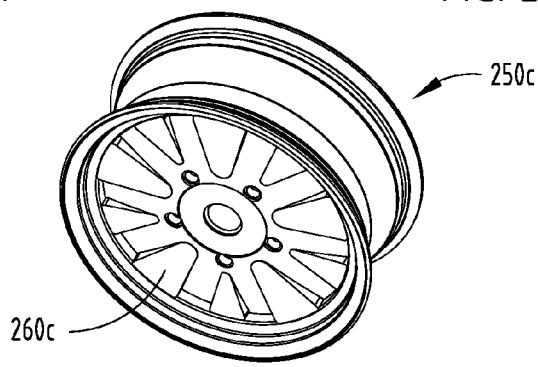

As shown in FIG. 19, the cast wheel 250 comprises an upper flange 254 and a lower flange 256 for retaining a vehicle tire wherein the upper and lower flanges 254, 256 are cast in the upper and lower flange casting cavities UF and LF (FIG. 18A). The rim portion 258 of the cast wheel is the result of the solidification of molten material in the rim casting cavity identified as $R_1$ and $R_2$ in FIG. 18A. The disk portion 260, as shown in FIG. 19, has an intricate design or spoke pattern disposed thereon as well as bolt holes 262 used for securing the cast wheel 250 to a vehicle assembly. The wheel disc design typically includes openings formed between spokes which allows air to flow to the vehicle brakes thereby cooling the vehicle brakes in use. The spaced apart spokes also provide for a lighter weight cast wheel assembly. As shown in FIGS. 20A-20C, the cast wheel assemblies 250a, 250b, and 250c can have several different configurations of the disk portion as determined by the metal base chill and sand printed mold components described above.

As shown in FIGS. 7, 12, 12A, and 15-18A, the sand printed mold package 200 includes guide elements or alignment features disposed on various components of the complete mold core package 200 (FIG. 18). For instance, the guide chambers 156 on the cold mold 150 are engaged by guide members 118 as disposed on the upper surface of the drag mold 100. The angled walls 116 disposed on an inner side of the drag mold 100 in the cavity 101 (FIG. 7) correlate and align with the angled walls 116' of the side cores 126, 128. Further, the lower guide members 136 disposed on the flat back portions 132 of side molds 126, 128 are adapted to be received in guide channels 114 disposed on the bottom wall 110 of the drag mold 100 in assembling the mold package 200. Likewise, the upper guide members 134 disposed on the flat back portions 132 of side molds 126, 128 are adapted to be received in guide channels or guide chambers 157 disposed on the lower surface 154 of the cope mold 150. All in all, the guide elements or alignment features of the present invention are adapted to provide interlocking engagement of the mold components for efficient and accurate assembly of the mold core package 200. The additive manufacturing techniques described above, allow for intricate designs for the guide features and alignment features such that proper assembly is ensured. Further, it is noted that the present invention contemplates several different alignment feature configurations for use with the present invention.

Given that the mold packages of the present invention are sacrificial sand printed mold packages, there is no need to incorporate intricate designs for cooling lines and other complex thermal control elements in printing the mold package for the casting of a prototype wheel assembly. This is because the base chill 120 allows for directional solidification of the molten material 212 cast in the mold core package 200. The directional solidification of the molten material 212, as shown in FIG. 18B, helps prevent hot tears from forming, reduces or eliminates porosity in the final cast part, and helps ensure that air is not trapped in the cast part during the solidification process. The directional solidification also helps prevent shrinkage defects and gives a dense solid homogeneous formation of the cast part. In a casting process, solidification of a molten material generally occurs based on the relative thickness of the casting, wherein thicker cavities generally cool at a lower rate than thin cavity formations. Using a metal base chill, the present invention induces directional solidification of the molding cavities from the bottom up. This directional solidification occurs even though casting cavities disposed at the bottom of the form may in fact be larger than other cavities not disposed adjacent to the metal base chill, such as the annular rim cavities. Metal alloys will shrink as the material solidifies, and if molten material is not available to compensate for this shrinkage, a shrinkage defect will form. Using directional solidification, as opposed to progressive solidification, which would occur generally based on the configuration of the molding cavity from thinnest to thickest parts of the casting cavity, shrinkage defects can be greatly reduced or eliminated altogether. Multiple directional solidification patterns leads to overall delayed solidification times. This can lead to increased scrap rates and irregular surface shapes such that cast articles either can't be used or require large amounts of post-casting machining to have a workable finished cast part.

The sandprinting techniques of the present invention are used to create mold components to create a sand printed mold package that is capable of casting prototype wheel assemblies. The present invention allows for experimental prototype wheel assembly designs to be quickly produced without the traditional foundry die design used in the prior art which typically involves large design lead times, high scrap rates, and less than optimal production rates. The present invention eliminates the need for producing production quality mold core packages for casting a wheel assembly and replaces them with sacrificial sand printed mold core packages which can be quickly made and intricately designed based on 3D CAD software. In this way, experimental prototype wheel designs can be quickly produced at much lower costs for use in vehicle testing.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A method of casting a wheel assembly, comprising:
   sand printing a drag mold, a cope mold and at least one mold insert, wherein the drag mold includes a cavity and a chill support chamber, and further wherein and the cope mold includes a frustum projection having a lower surface defining a wheel disk pattern;
   positioning a metal chill in the chill support chamber of the drag mold;
   inserting the mold insert into the cavity of the drag mold;
   forming a casting cavity, wherein the cavity is the shape of the desired casting, by closing the cope mold on the drag mold such that the frustum projection of the cope mold is generally disposed within the cavity of the drag mold; and
   casting a molten alloy into the casting cavity, such that a least a portion of the molten alloy is disposed adjacent to the chill; and
   allowing the molten alloy to directionally solidify beginning with molten alloy disposed adjacent to the chill.

2. The method of claim 1, wherein the step of sand printing a drag mold, a cope mold and at least one mold insert further comprises:
   (a) depositing a thin layer of particulate in a printing area of a sand printing device;
   (b) selectively applying a binding agent to the thin layer of particulate to define a cross-section of one of a drag mold, a cope mold and at least one mold insert;
   repeating steps (a) and (b) to produce one of a drag mold, a cope mold and at least one mold insert.

3. The method of claim 1, further comprising:
  providing one or more risers having riser cavities in fluid communication with the casting cavity.

4. The method of claim 3, wherein the step of casting a molten alloy into the mold cavity further comprises:
  filling the riser cavities with the molten alloy.

5. The method of claim 4, wherein the step of allowing the molten alloy to directionally solidify beginning with molten alloy disposed adjacent to the chill further comprises:
  gravitationally feeding molten material to the casting cavity from the riser cavities as the molten alloy solidifies.

6. The method of claim 1, further comprising:
  breaking away the drag mold, the cope mold and the at least one mold insert and removing the metal chill to form a wheel assembly.

7. A method of casting a prototype wheel assembly, comprising:
  sand printing a sacrificial cope mold portion and a sacrificial drag mold portion, the cope and drag mold portions having walls defining at least in part a mold cavity for a prototype wheel;
  positioning a chill in the drag mold;
  positioning at least one internal core within either the cope mold portion or the drag mold portion, the at least one internal core configured to define at least in part a hub cavity, a disk cavity and a rim cavity within the mold cavity;
  closing the cope and drag mold portions around the at least one internal core; and
  casting a molten material into the mold cavity, such that a least a portion of the molten material contacts the chill;
  allowing the molten material to directionally solidify after filling the mold cavity beginning with molten material in contact with the chill;
  breaking away the sacrificial cope mold portion and the sacrificial drag mold portion to form a prototype wheel assembly having a hub section, a disk section and a rim section.

8. The method of claim 7, wherein the step of sand printing a sacrificial cope mold portion and a sacrificial drag mold portion further comprises:
  (a) depositing a thin layer of particulate in a printing area of a sand printing device;
  (b) selectively applying a binding agent to the thin layer of particulate to define a cross-section of one of a sacrificial cope mold portion and a sacrificial drag mold portion;
  repeating steps (a) and (b) to produce one of a sacrificial cope mold portion and a sacrificial drag mold portion.

9. The method of claim 7, further comprising:
  providing one or more risers having riser cavities in fluid communication with the mold cavity; and
  filling the riser cavities with the molten material.

10. The method of claim 9, wherein the step of allowing the molten material to directionally solidify beginning with molten material disposed adjacent to the chill further comprises:
  gravitationally feeding molten material to the casting cavity from the riser cavities as the molten material solidifies.

* * * * *